(12) United States Patent
Yamaguchi et al.

(10) Patent No.: US 11,293,344 B2
(45) Date of Patent: Apr. 5, 2022

(54) COVER MEMBER MOUNTING STRUCTURE FOR ENGINE

(71) Applicant: MAZDA MOTOR CORPORATION, Hiroshima (JP)

(72) Inventors: Keisuke Yamaguchi, Hiroshima (JP); Keiichi Kamimura, Hiroshima (JP); Yuzou Uotani, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/641,184

(22) PCT Filed: Aug. 2, 2018

(86) PCT No.: PCT/JP2018/029125
§ 371 (c)(1),
(2) Date: Feb. 21, 2020

(87) PCT Pub. No.: WO2019/039227
PCT Pub. Date: Feb. 28, 2019

(65) Prior Publication Data
US 2021/0010417 A1    Jan. 14, 2021

(30) Foreign Application Priority Data
Aug. 24, 2017    (JP) .............................. JP2017-161422

(51) Int. Cl.
*F02B 77/13*    (2006.01)
*F02F 7/00*    (2006.01)
(Continued)

(52) U.S. Cl.
CPC .......... *F02B 77/13* (2013.01); *B60R 16/0215* (2013.01); *F01M 11/12* (2013.01);
(Continued)

(58) Field of Classification Search
CPC . F02B 77/11; F02B 77/13; F02B 77/08; F02F 7/00; F02F 7/008; F02F 7/0068;
(Continued)

(56) References Cited

U.S. PATENT DOCUMENTS 4,697,782 A * 10/1987 Ban .......................... F02B 67/00
                                                         123/195 A
5,022,365 A    6/1991 Nariyama
(Continued)

FOREIGN PATENT DOCUMENTS

JP    H267427 A    3/1990
JP    H0601739 U    1/1994
(Continued)

OTHER PUBLICATIONS

International Search Report issued in PCT/JP2018/029125; dated Oct. 9, 2018.

*Primary Examiner* — Grant Moubry
(74) *Attorney, Agent, or Firm* — Studebaker & Brackett PC

(57) ABSTRACT

An engine cover member mounting structure, including: an engine body; a peripheral member arranged on an outer wall of the engine body; a cover member arranged between the outer wall and the peripheral member; and a harness routed between the outer wall and the peripheral member, wherein the harness is held on a surface of the cover member.

6 Claims, 10 Drawing Sheets

(51) Int. Cl.
*B60R 16/02* (2006.01)
*F01M 11/12* (2006.01)
*F02B 63/04* (2006.01)

(52) U.S. Cl.
CPC ............ *F02B 63/042* (2013.01); *F02F 7/008* (2013.01); *F02F 7/0068* (2013.01)

(58) Field of Classification Search
CPC ....... F02F 7/0065; F02F 7/0073; B60R 16/02; B60R 16/0207; B60R 16/0215; H02G 3/38; H02G 3/36
See application file for complete search history.

(56) References Cited

U.S. PATENT DOCUMENTS

| | | | |
|---|---|---|---|
| 5,668,351 A * | 9/1997 | Hanlon | B60R 16/0215 174/68.3 |
| 6,834,634 B2 * | 12/2004 | Lawrence | F02F 7/0007 123/195 A |
| 9,551,366 B2 * | 1/2017 | O'Donnell | E02F 9/2275 |
| 10,208,705 B2 * | 2/2019 | Takahata | B60R 16/0215 |
| 10,507,773 B2 * | 12/2019 | Takii | F02B 77/00 |
| 2006/0131049 A1 * | 6/2006 | Kogure | B60R 16/0215 174/72 A |
| 2007/0113816 A1 * | 5/2007 | Griessbach | F02M 35/10249 123/184.47 |
| 2009/0056668 A1 | 3/2009 | Hazelton | |

FOREIGN PATENT DOCUMENTS

| | | | |
|---|---|---|---|
| JP | H10176543 A | | 6/1998 |
| JP | 2000335489 A | * | 12/2000 |
| JP | 200120752 A | | 1/2001 |
| JP | 200429513 A | | 1/2004 |
| JP | 2014163408 A | | 9/2014 |

* cited by examiner

HORIZONTAL DIRECTION
REAR ⟵⟶ FRONT

REAR ←— HORIZONTAL DIRECTION —→ FRONT

COVER MEMBER MOUNTING STRUCTURE FOR ENGINE

TECHNICAL FIELD

The present disclosure relates to an engine cover member mounting structure.

BACKGROUND ART

For the purpose of thermal and sound insulation of an engine, a cover member can be provided on an outer wall of a cylinder block.

A harness for an oil level sensor or any other components is arranged around the cylinder block, and thus, the position of the harness needs to be considered if the cover member is attached.

For example, Patent Document 1 discloses a structure in which a harness is embedded in a sound insulator attached to an outer surface of a transmission.

CITATION LIST

Patent Document

Patent Document 1: Japanese Unexamined Patent Publication No. 2014-163408

SUMMARY OF THE INVENTION

Technical Problem

However, if the harness is embedded in the cover member with reference to the technology described in Patent Document 1, repair and replacement of the harness cannot be performed easily. In addition, peripheral members, e.g., an intake system, and accessories such as an alternator and a compressor for an air conditioner, are arranged on an outer wall of an engine body. Embedding the harness in the cover member makes the cover member thick, and makes the peripheral members separated from the engine body. This is inconvenient from the viewpoint of layout.

Therefore, it is an object of the present disclosure to provide an engine cover member mounting structure capable of properly routing a harness, facilitating repair and replacement of the harness, and downsizing an engine through appropriate layout of the engine and peripheral members.

Solution to the Problem

In order to solve the above problem, in the present disclosure, a harness is held on a surface of a cover member.

Specifically, an engine cover member mounting structure disclosed herein includes: an engine body; a peripheral member arranged on an outer wall of the engine body; a cover member arranged between the outer wall and the peripheral member; and a harness routed between the outer wall and the peripheral member, and the harness is held on a surface of the cover member.

With this configuration, when the peripheral member is arranged on the outer wall of the engine, the harness is held on the surface of the cover member arranged between the outer wall of the engine and the peripheral member, so that the harness is routed between the outer wall of the engine and the peripheral member. Thus, the harness can be repaired and replaced more easily than the harness embedded in the cover member. This can reduce the increase in thickness of the cover member, and can reduce the distance between the engine body and the peripheral member, thereby achieving appropriate layout of the peripheral member.

In a preferred embodiment, the harness is held on a surface of the cover member facing the outer wall.

With this configuration, the harness is held on the surface of the cover member facing the outer wall of the engine. This can effectively protect the harness from damage during the assembly, repair, or replacement of the peripheral member.

Moreover, an engine cover member mounting structure disclosed herein includes: an engine body; a peripheral member arranged on an outer wall of the engine body; a cover member arranged between the outer wall and the peripheral member; and a harness routed between the outer wall and the cover member, and the harness is held on a surface of the cover member facing the outer wall.

With this configuration, the harness is held on the surface of the cover member facing the engine body so that the harness is routed between the outer wall of the engine and the cover member. This can reduce the increase in thickness of the cover member, and can contribute to the downsizing of the engine, compared to the case in which the harness is embedded in the cover member.

In a preferred embodiment, a groove is formed in the surface of the cover member facing the outer wall, and the groove receives the harness.

With this configuration, the harness is received and held in the groove formed in the surface of the cover member facing the engine body. This can hold the harness easily and block the harness from displacement without need of any additional member for holding the harness, and can facilitate the replacement of the harness.

In a preferred embodiment, the peripheral member is attached to the outer wall of the engine body via a support, and the support is provided with a guide mechanism that allows the peripheral member to move toward the engine body when a load is inputted to the peripheral member in a direction toward the engine body.

The support of the peripheral member is provided with the guide mechanism that allows the peripheral member to move toward the engine body. Thus, when a load acts on the peripheral member in a direction toward the engine body, i.e., in a direction from the side opposite to the engine body toward the engine body, upon collision of the vehicle, for example, the peripheral member can move to absorb the load, thereby protecting the engine body from serious damage. In the engine including such a guide mechanism, the harness of this configuration is received in the groove formed in the cover member. This can protect the harness when the peripheral member moves, and can ensure sufficient space for the movement of the peripheral member toward the engine body. Thus, the peripheral member can effectively absorb the load inputted.

In a preferred embodiment, the peripheral member is an accessory, in particular, an alternator.

With this configuration, the cover member can reduce the influence of, for example, electromagnetic noise of the alternator on the harness. This can increase the degree of flexibility in the routing of the harness.

In a preferred embodiment, a connector portion is formed on at least one end of the harness for connection to a different member, and the connector portion is positioned outside the cover member.

This configuration can ensure ease of removal of members, such as an oil level sensor, to which the harness is connected.

Further, an engine cover member mounting structure disclosed herein includes: an engine body; an accessory arranged on an outer wall of the engine body facing forward in a longitudinal direction of a vehicle; a cover member arranged between the outer wall and the accessory; and a harness routed between the outer wall and the accessory. The accessory is attached to the outer wall of the engine body via a support. The support is provided with a guide mechanism that allows the accessory to move rearward when a load toward a rear side in the longitudinal direction of the vehicle is inputted to the accessory. The harness is held in a groove formed to be recessed in a thickness direction of the cover member in a surface of the cover member facing the outer wall. A connector portion is formed on at least one end of the harness for connection to a different member, and the connector portion is positioned outside the cover member and the accessory when viewed from the front of the vehicle.

Advantages of the Invention

As can be seen in the foregoing, with this configuration, when the peripheral member is arranged on the outer wall of the engine, the harness is held on the surface of the cover member arranged between the outer wall of the engine and the peripheral member, so that the harness is routed between the outer wall of the engine and the peripheral member. Thus, the harness can be repaired and replaced more easily than the harness embedded in the cover member. This can reduce the increase in thickness of the cover member, and can reduce the distance between the engine body and the peripheral member, thereby achieving appropriate layout of the peripheral member.

BRIEF DESCRIPTION OF THE DRAWINGS

FIG. 1 is a schematic plan view illustrating a vehicle on which an engine having a cover member mounting structure according to an embodiment is mounted.

FIG. 2 is a front view illustrating the engine as viewed from the front.

FIG. 3 is a cross-sectional view taken along line in FIG. 2.

FIG. 4 is a right side view illustrating an accessory drive system of the engine shown in FIG. 2.

FIG. 5 is an enlarged view illustrating a portion near an alternator shown in

FIG. 6 is a view as seen from a cylinder block side, illustrating a cover member to which a harness is attached.

FIG. 7 is a view illustrating a state where some of the members shown in FIG. 2 are removed.

FIG. 8 is a view illustrating a state where the alternator shown in FIG. 6 is removed.

FIG. 9 is a view illustrating how the cover member is attached in a cover member mounting structure according to the present embodiment.

FIG. 10 is a view illustrating a configuration of a support of an alternator according to a fifth embodiment.

DESCRIPTION OF EMBODIMENTS

Embodiments of the present disclosure will be described in detail with reference to the drawings. The following embodiments are merely exemplary ones in nature, and are not intended to limit the scope, applications, or use of the disclosure.

Vehicle and Directions

Figure 1:
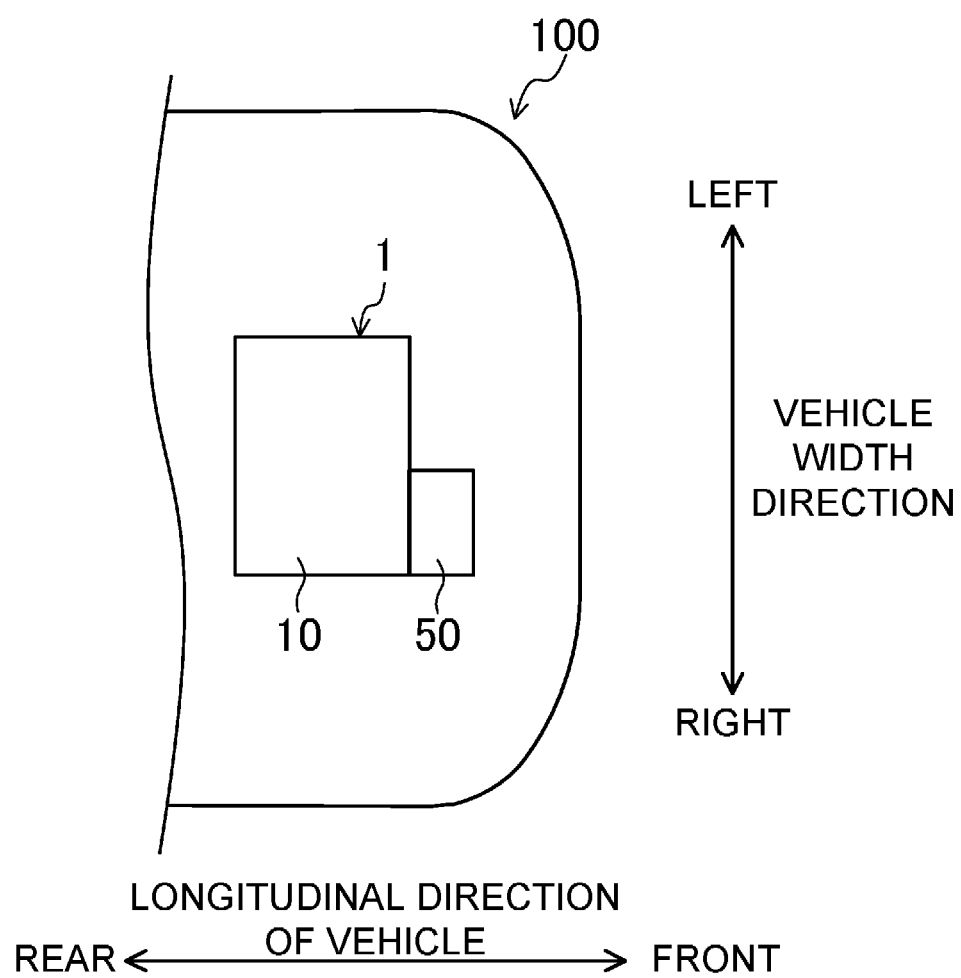
[FIG. 1]
Figure 2:
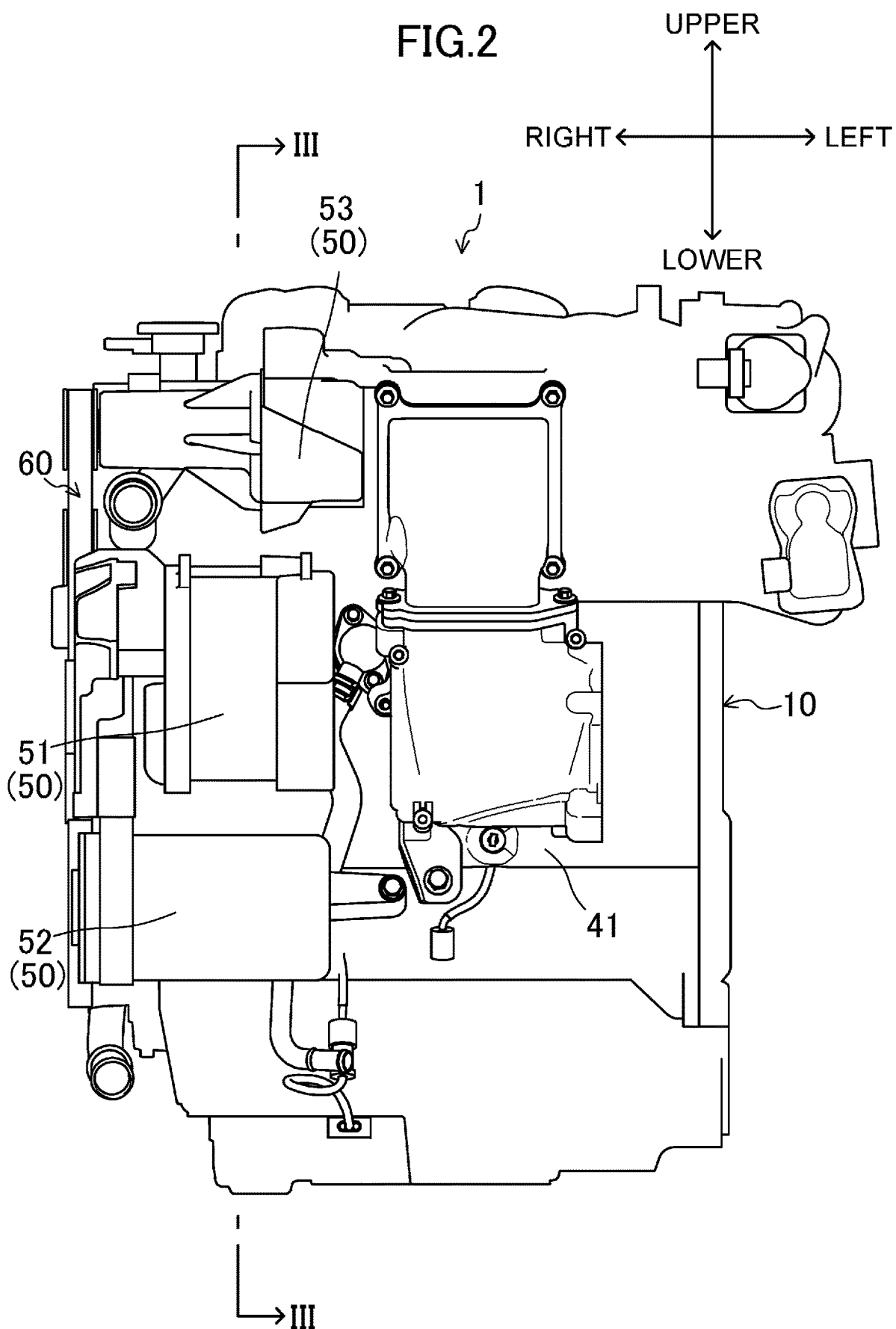
[FIG. 2]
Figure 3:
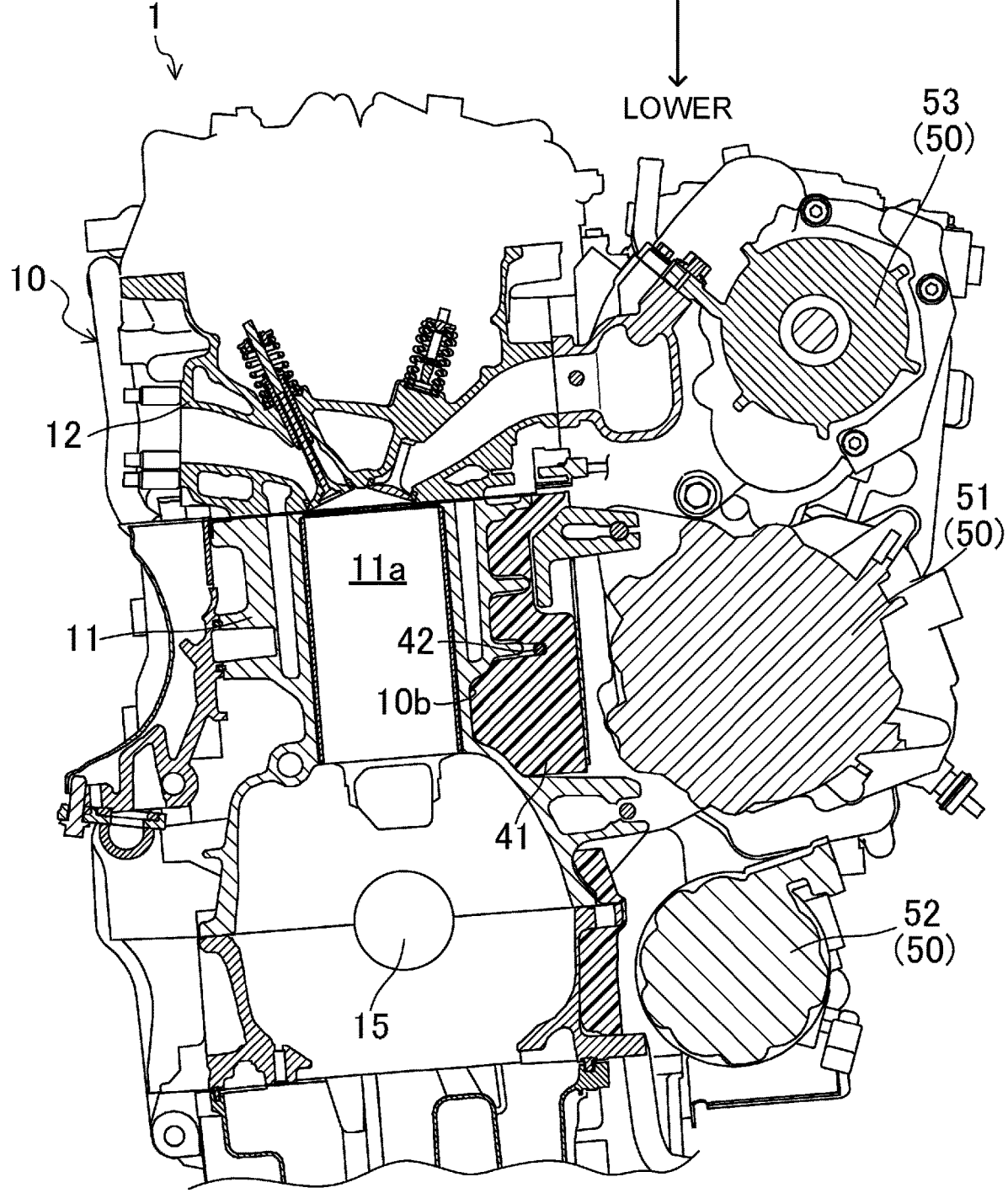
[FIG. 3]

FIG. 1 is a schematic plan view illustrating a front portion of a vehicle 100 on which an engine 1, to which a cover member mounting structure according to the present embodiment is applied, is mounted. FIG. 2 illustrates the engine 1 as seen from the front. FIG. 3 is a cross-sectional view taken along line in FIG. 2, illustrating the section of the engine 1 as viewed from the right.

The vehicle 100 is configured as a front-engine, front-wheel-drive vehicle (FF vehicle). The cover member mounting structure of the present embodiment is not limited to the FF vehicle, and may be applied to an engine mounted on an FR vehicle, an MR vehicle, or an RR vehicle.

In this specification, the directions are defined relative to the vehicle 100 placed on a road surface. That is, a "front-rear direction" is the same as a longitudinal direction of the vehicle 100 as shown in FIG. 1, and in this direction, the side toward an engine body 10 is defined as the rear side, and the side opposite to the engine body 10 is defined as the front side, as shown in FIG. 3. A "left-right direction" is the same as a vehicle width direction of the vehicle 100 as shown in FIG. 3, and in this direction, the driving side of the engine 1 is defined as the right side, and the side opposite to the driving side is defined as the left side, as shown in FIG. 2. A "vertical direction" is the same as a direction perpendicular to the "front-rear direction" and the "left-right direction," i.e., a direction perpendicular to the road surface, and in this direction, the side toward a cylinder head 12 is defined as the upper side, and the side toward a cylinder block 11 is defined as the lower side, as shown in FIG. 3. Note that the engine body 10 is formed so that an axial direction of cylinder bores 11a is slightly inclined with respect to the "vertical direction" as shown in FIG. 3.

Engine

The engine 1 mounted on the vehicle 100 is a multi-cylinder internal combustion engine. Specifically, the engine 1 disclosed herein is an inline-four gasoline engine. The engine 1 is "transversely" mounted such that the direction in which the cylinders are arranged substantially coincide with the vehicle width direction, and is configured as a so-called front intake and rear exhaust engine.

As shown in FIG. 3, the engine 1 includes an engine body 10 having a cylinder block 11 and a cylinder head 12. Various members including a plurality of accessories 50 (peripheral members) are attached to an outer wall of the engine body 10.

Cylinder bores 11a are formed in the cylinder block 11, and pistons (not shown) move up and down in the cylinder bores 11a. A combustion chamber is formed by a surface of each piston, a wall surface of each cylinder bore 11a, and a wall surface of the cylinder head 12. The pistons are connected to a crankshaft 15 provided below the cylinder block 11 via a connecting rod (not shown), and power obtained by combustion of an air-fuel mixture in the combustion chambers is delivered to the outside through the crankshaft 15.

Accessories

The accessories 50 are peripheral devices provided for assisting an engine operation of the engine body 10. Examples thereof include a supercharger 53, an alternator 51 (peripheral member), and an air compressor 52 used for the air-conditioning purpose which are sequentially arranged from the top along a front outer wall 10b of the engine body 10, a water pump (not shown) for cooling an engine coolant arranged along a rear outer wall of the engine body 10, an intake device, an exhaust device, and a fuel injector which are not shown and provided for the cylinder head 12, and a starting device provided around the engine body 10. For example, the supercharger 53 compresses intake air to increase a substantial amount of exhaust gas from the engine 1. The air compressor 52 is used for conditioning the air in the vehicle 100. The water pump functions as a pump, and constitutes a cooling system for the engine 1.

Accessory Drive System

Figure 4:
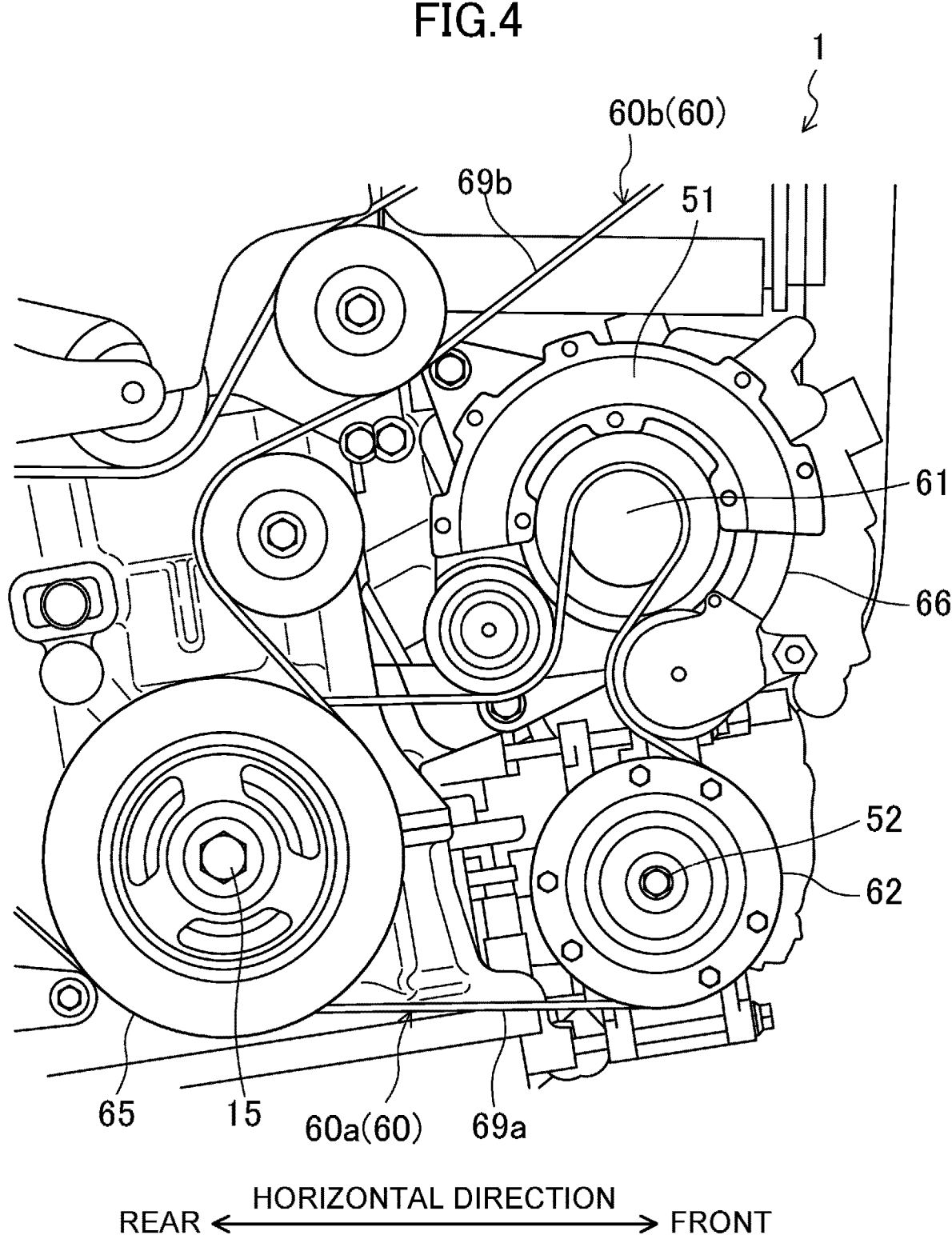
[FIG. 4]

As shown in FIGS. 2 and 4, an accessory drive system 60 configured to drive and couple the engine body 10 and the accessories 50 is arranged on the right end side of the crankshaft 15 in a long axis direction thereof.

The accessory drive system 60 includes a crankshaft pulley 65, an alternator drive pulley 61, an air compressor drive pulley 62, a water pump drive pulley (not shown), a plurality of driven pulleys (details are omitted), an automatic tensioner (e.g., a double arm tensioner 66), an inner belt 69a, and an outer belt 69b. The crankshaft pulley 65, the alternator drive pulley 61, the air compressor drive pulley 62, the double arm tensioner 66, and the inner belt 69a form a first drive system 60a, and the crankshaft pulley 65, the water pump drive pulley, the driven pulleys, and the outer belt 69b form a second drive system 60b independent of the first drive system 60a.

The first and second drive systems 60a and 60b have similar driving modes. Thus, how the accessories 50 are driven will be described taking the first drive system 60a as an example, and the description of the second driving system 60b will not be repeated. In the first drive system 60a, as shown in FIG. 4, operation of the engine body 10 allows the crankshaft pulley 65 to be rotationally driven via the crankshaft 15. Rotation of the crankshaft pulley 65 allows its power to be transmitted through the inner belt 69a to the alternator drive pulley 61 and the air compressor drive pulley 62. Power transmitted to each of the pulleys is used to drive an associated one of the accessories. In other words, the alternator drive pulley 61 rotates under the transmitted power, and actuates the alternator 51. Likewise, the air compressor drive pulley 62 actuates the air compressor 52. Provision of the double arm tensioner 66 allows tension T of the inner belt 69a to be kept substantially constant. In this manner, the accessories 50 are driven by the power outputted from the crankshaft 15.

Alternator

The alternator 51 will be described in detail below.

As shown in FIGS. 2 and 3, the alternator 51 is arranged near the right end of the outer wall 10b of the engine body 10 to generate an alternating current for use in an electrical system.

Support

Figure 5:
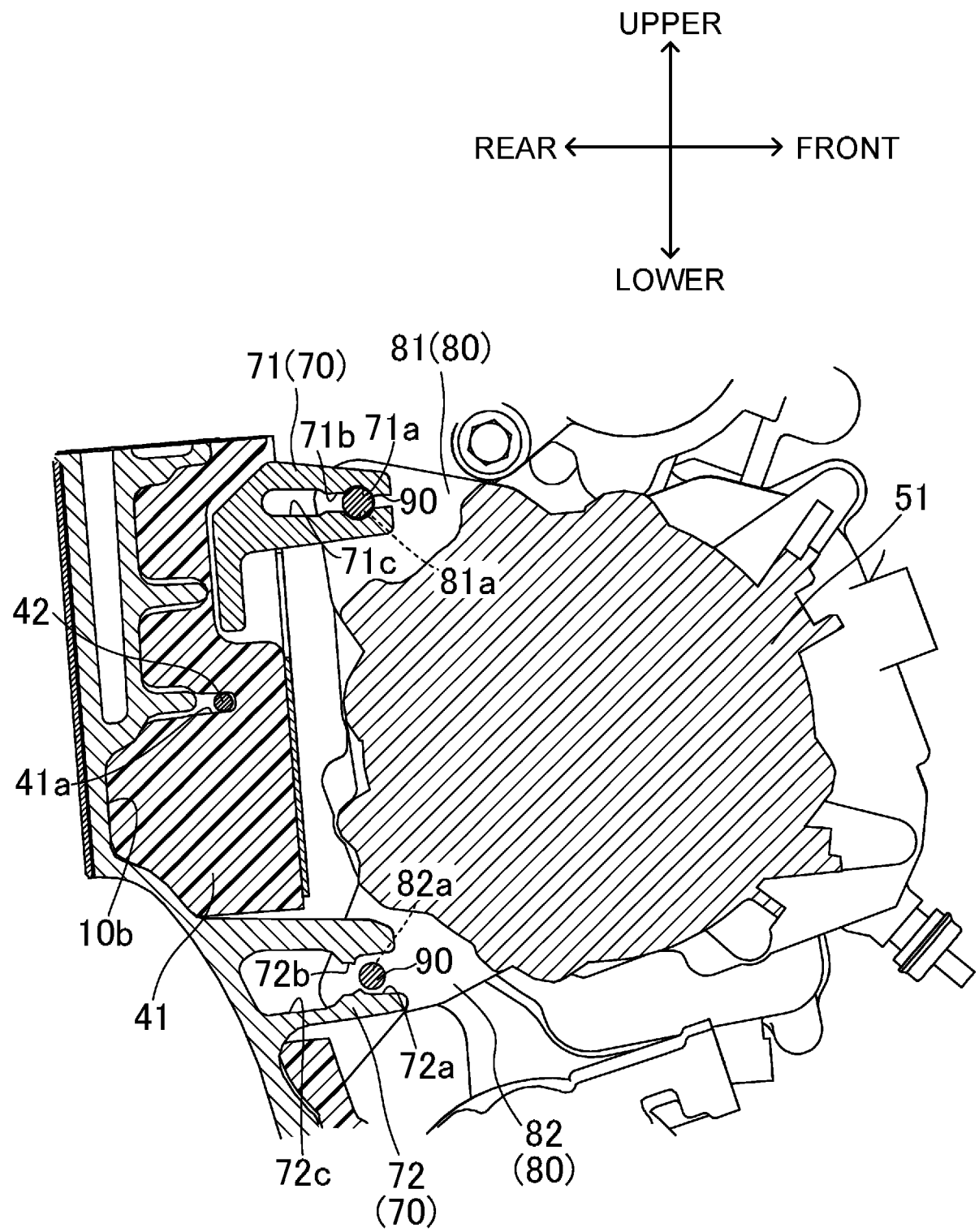
[FIG. 5]

As shown in FIG. 5, the alternator 51 is attached to the outer wall 10b of the engine body 10 via a support. That is, the support includes an engine body support 70 provided separately from or integrally with the outer wall 10b of the engine body 10, an accessory support 80 provided separately from or integrally with the alternator 51, and bolts 90 for connecting the engine body support 70 and the accessory support 80.

The engine body support 70 includes an upper engine body support 71 and a lower engine body support 72. The accessory support 80 includes an upper accessory support 81 and a lower accessory support 82. The upper engine body support 71 is connected to the upper accessory support 81 by the bolt 90, and the lower engine body support 72 is connected to the lower accessory support 82 by the bolt 90.

As shown in FIG. 5, the upper and lower accessory supports 81 and 82 that constitute the accessory support 80 are both provided to protrude from a rear portion of the alternator 51 toward the engine body 10 in a substantially flange shape. The upper accessory support 81 has an upper accessory shaft hole 81a through which the bolt 90 is inserted along the left-right direction. This upper accessory shaft hole 81a has a circular cross section, and has a slightly larger diameter than the bolt 90. The bolt 90 inserted through the upper accessory shaft hole 81a moves integrally with the alternator 51. The lower accessory support 82 also has a lower accessory shaft hole 82a configured similarly to the upper accessory shaft hole 81a.

Here, the engine body support 70 is provided with a guide mechanism that allows the alternator 51 to move toward the engine body 10 when a load is inputted to the alternator 51 in the direction toward the engine body 10, that is, in the direction from the front side to the rear side of the alternator 51. Specifically, as shown in FIG. 5, a groove extending in the front-rear direction is cut as the guide mechanism in the upper engine body support 71. The groove is formed by an upper shaft hole 71a, an upper intermediate portion 71b, and an upper elongated hole 71c. Almost similarly to the upper engine body support 71, the lower engine body support 72 is also provided with a groove that serves as the guide mechanism and is formed by a lower shaft hole 72a, a lower intermediate portion 72b, and a lower elongated hole 72c. Hereinafter, the upper and lower shaft holes 71a and 72a may be referred to as a "shaft hole 71a, 72a," the upper and lower intermediate portions 71b and 72b may be referred to as an "intermediate portion 71b, 72b," and the upper and lower elongated holes 71c and 72c may be referred to as an "elongated hole 71c, 72c."

The shaft hole 71a, 72a is provided to receive the bolt 90 inserted therein, and has a circular cross section and a slightly larger diameter than the bolt 90.

The intermediate portion 71b, 72b is provided adjacent to the side of the shaft hole 71a, 72a toward the engine body 10, and is formed as a groove having a vertical height smaller than the vertical diameter of the shaft hole 71a, 72a. Further, the intermediate portion 71b, 72b is configured to have a vertical height slightly smaller than the diameter of the shaft portion of the bolt 90. Thus, when the vibration is generated during the normal operation of the vehicle 100, the bolt 90 stays at the position of the shaft hole 71a, 72a and does not move toward the engine body 10 due to the presence of the intermediate portion 71b, 72b. During the normal operation, the support supports and regulates the alternator 51 not to move in the front-rear direction, i.e., not to move toward nor away from the engine body 10.

The elongated hole 71c, 72c is provided adjacent to the side of the intermediate portion 71b, 72b toward the engine body 10 to extend in the front-rear direction, and has a vertical height substantially equal to or greater than the vertical diameter of the shaft hole 71a, 72a. For example, when a load equal to or greater than a predetermined value is inputted from the front to the vehicle 100 upon head-on collision, the bolt 90 passes through the intermediate portion 71b, 72b and slides inside the elongated hole 71c, 72c. The alternator 51 is guided by the intermediate portion 71b, 72b and the elongated hole 71c, 72c to be able to move toward the engine body 10 by the length in the front-rear direction of the intermediate portion 71b, 72b and the elongated hole 71c, 72c.

With the above configuration, the alternator 51 is maintained at a normal position during the normal operation, and is moved toward the engine body 10 when a load equal to or greater than a predetermined value is inputted to the engine 1 from the front. Thus, the load can be efficiently absorbed, and serious damage to the engine body 10 can be reduced. The intermediate portion 71b, 72b and the elongated hole 71c, 72c respectively have appropriate lengths in the front-rear direction so that the alternator 51 does not make contact with the engine body 10 when the alternator 51 moves.

Engine Cover Member Mounting Structure

As shown in FIGS. 1 and 5, a cover member 41 is arranged between the outer wall 10b and the alternator 51. A harness 42 to be connected to various sensors is routed between the outer wall 10b and the cover member 41.

One of the features of the cover member mounting structure according to the present embodiment is that the harness 42 is held on the side of the cover member 41 facing the outer wall 10b, i.e., on the surface of the cover member 41 facing the engine body 10. The configuration will be described in detail below.

Cover Member

As shown in FIGS. 1 and 2, the cover member 41 is arranged in front of the cylinder block 11, and functions as a thermal insulator, a protector, and a sound insulator for the engine body 10. The cover member 41 can be made of any material as long as it can function as the thermal insulator, the protector, and the sound insulator for the engine body 10. Specific examples of such a material include a resin such as a urethane resin. Note that the cover member 41 may be arranged on a portion of the outer wall 10b of the engine body 10, or almost entirely on the outer wall 10b including the position to which the harness 42 is routed. The cover member 41 can be formed by injection molding, extrusion molding, vacuum molding, or foam molding.

A harness groove 41a (groove) is formed in a portion of the cover member 41 facing the outer wall 10b, i.e., in the surface facing the engine body 10. The harness 42 is held with a harness body 42a thereof, which will be described later, received in the harness groove 41a.

As shown in FIG. 5, the harness groove 41a has a vertical height, i.e., a groove width, which is substantially equal to the diameter of the harness body 42a. Thus, the harness groove 41a can securely fix and hold the harness body 42a that is pushed into it. The harness body 42a, which is merely pushed into the harness groove 41a, allows the harness 42 to be easily taken out for replacement. Further, the harness body 42a, received in the harness groove 41a, can block the harness 42 from displacement during the assembly of the harness 42, the cover member 41, and the alternator 51 to the engine body 10, or when the vehicle 100 vibrates.

The depth of the harness groove 41a is not particularly limited as long as it can hold the harness 42. However, to securely hold the harness 42 and to protect the harness 42 from damage due to contact with the outer wall 10b of the engine body 10, the depth is desirably greater than the diameter of the harness 42. Specifically, the depth of the harness groove 41a is desirably set such that the harness body 42a makes no contact with the surface of the outer wall 10b, i.e., is preferably held at a predetermined distance from the outer wall 10b, for example, when the harness 42 is received in the harness groove 41a to be assembled to the outer wall 10b of the engine body 10 as shown in FIG. 5.

Figure 6:
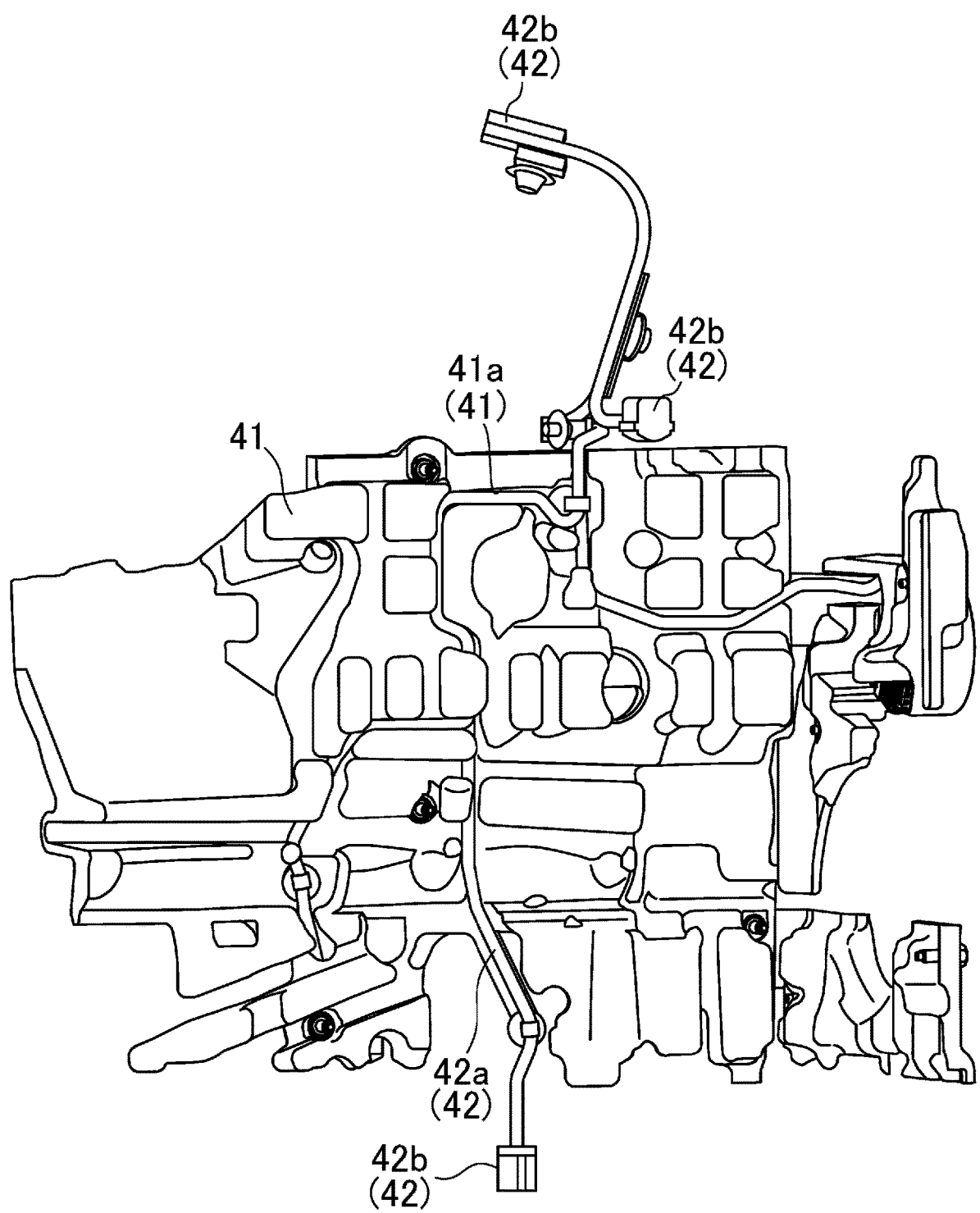
[FIG. 6]

As shown in FIG. 6, in the cover member mounting structure according to the present embodiment, a portion of the harness body 42a in contact with the cover member 41 is entirely received in the harness groove 41a. The harness groove 41a may be formed to receive only a portion of the harness body 42a, but in a preferred embodiment, the harness groove 41a is configured to receive the entire portion of the harness body 42a making contact with the cover member 41 from the viewpoint of protecting the harness 42.

The cover member 41 may have another groove on the side thereof toward the engine body 10 in addition to the harness groove 41a. This can keep the cover member 41 flexible, and facilitates the assembly to the engine body 10.

Harness

FIG. 6 is a view illustrating the cover member 41 as viewed from behind, that is, from the engine body 10 side. As shown in FIG. 6, the harness 42 includes the harness body 42a, and a connector portion 42b which is formed on at least one end of the harness body 42a for connection to a different member such as various sensors or any other components.

The harness groove 41a of the cover member 41 receives the harness body 42a, and the connector portion 42b is positioned outside the cover member 41. In the present embodiment, the connector portion 42b is provided on each of the upper and lower ends of the cover member 41. The position and number of the connector portions 42b can be appropriately set according to the configuration of the engine 1.

Cover Member Mounting Structure

Figure 7:
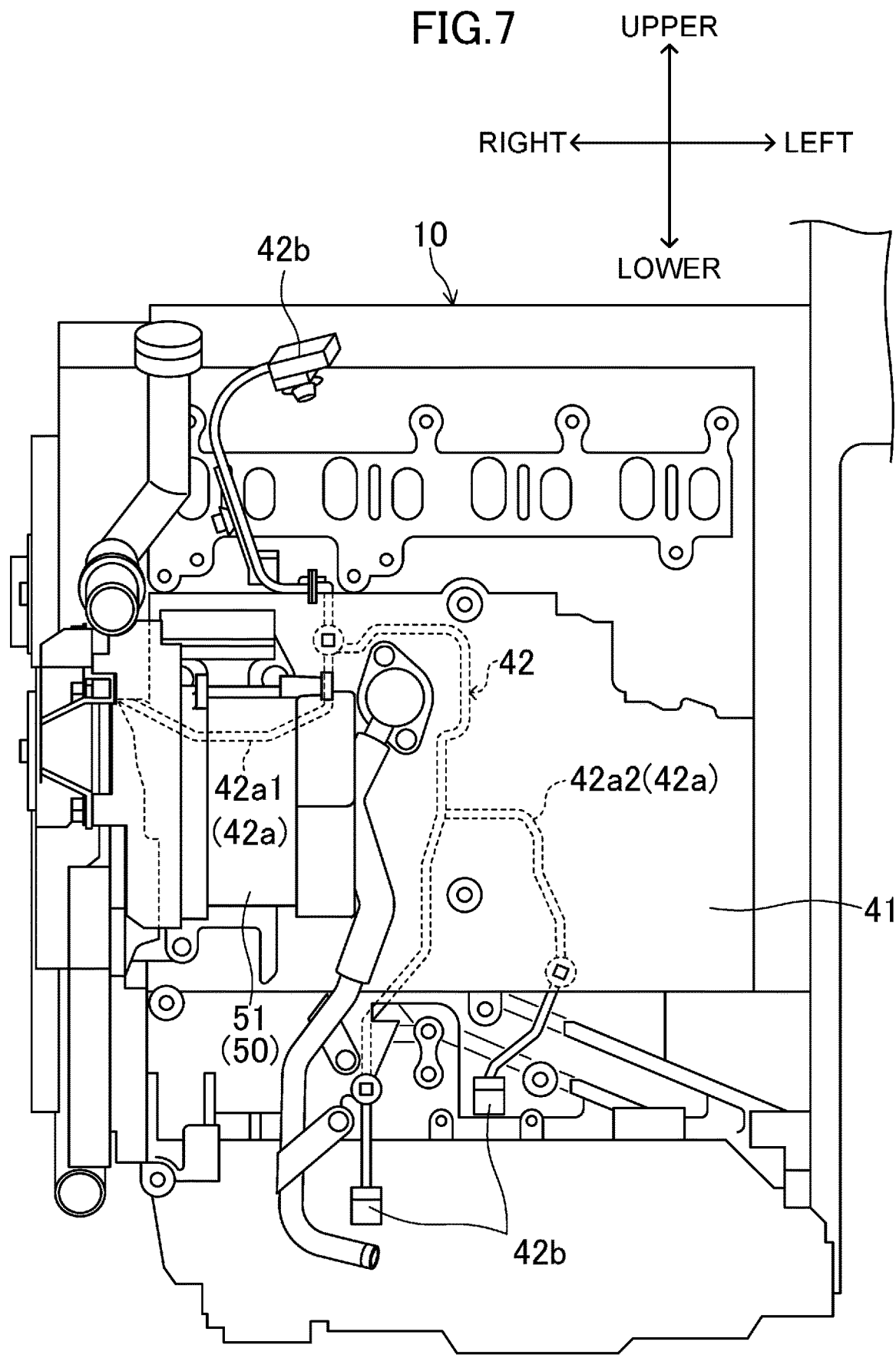
[FIG. 7]
Figure 8:
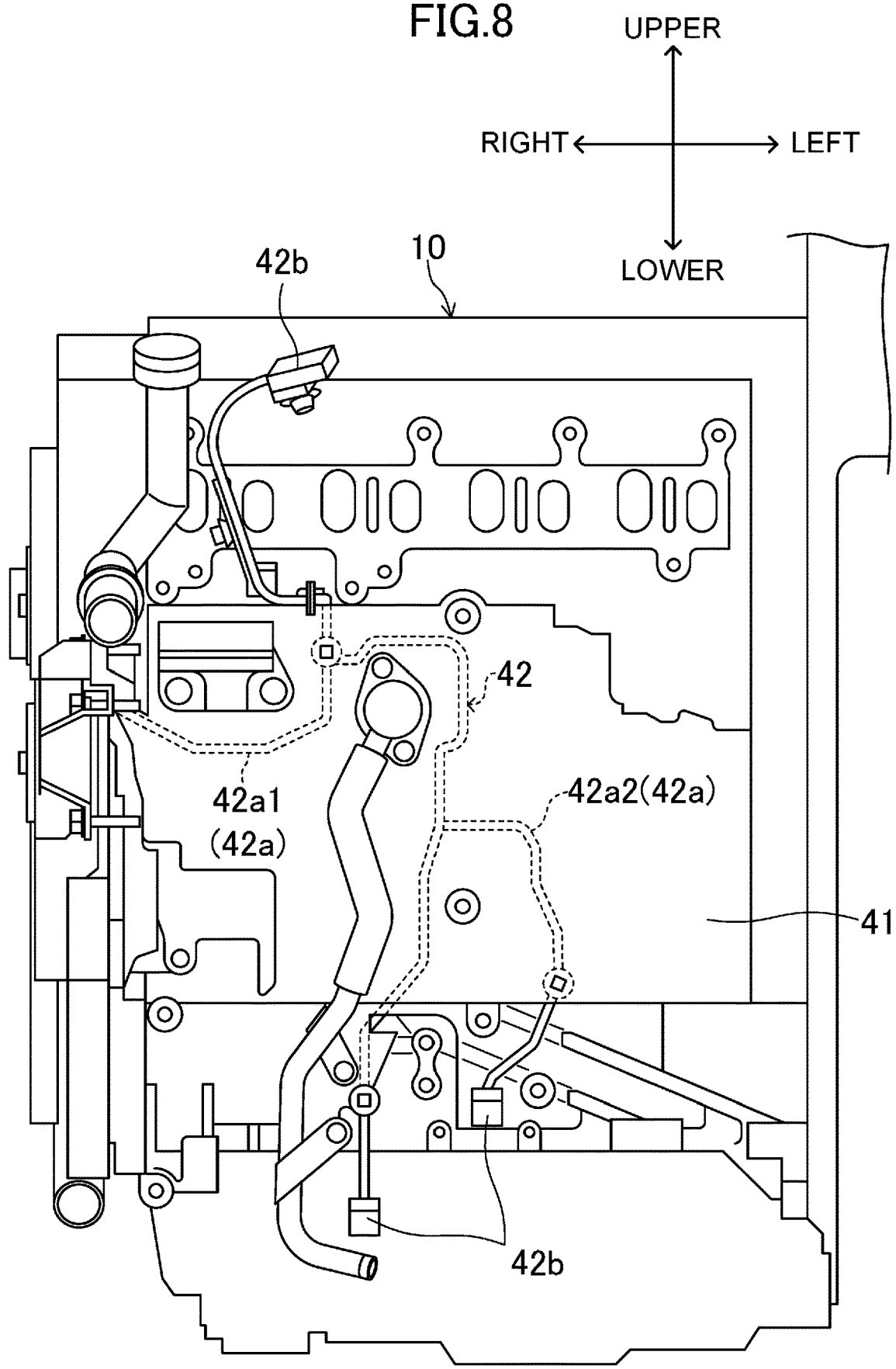
[FIG. 8]

FIG. 7 is a front view of the engine 1 from which some of the members are removed. FIG. 8 is a view illustrating a state in which the alternator 51 shown in FIG. 7 is removed.

As shown in FIGS. 7 and 8, in a state where the cover member 41 receiving the harness 42 and the alternator 51 are assembled to the engine body 10, the harness body 42a of the harness 42 covered with the cover member 41 includes a first harness body 42a1 and a second harness body 42a2. When viewed from the front, the first harness body 42a1 is located between the alternator 51 and the engine body 10, but the second harness body 42a2 is not located between the alternator 51 and the engine body 10.

Specifically, at a position where the alternator 51 is attached, the first harness body 42a1 and the cover member 41 covering the first harness body 42a1 are present. As described above, when a load equal to or greater than a predetermined value is inputted to the alternator 51 from the front, the alternator 51 can move toward the engine body 10. That is, the alternator 51 is pressed against the cover member 41. At this time, the first harness body 42a1 is inserted into the harness groove 41a and covered with the cover member 41, so that the first harness body 42a1 can be protected from damage even when the alternator 51 moves back toward the engine body 10. In other words, the first harness body 42a1 inserted into and protected by the harness groove 41a can ensure sufficient space for the rearward movement of the alternator 51 in case of collision, so that the alternator 51 can effectively absorb the load.

Further, the harness 42 is protected from electromagnetic noise (made less susceptible to noise) of the alternator 51 by the cover member 41. This can increase the degree of flexibility in the routing of the harness 42.

Moreover, holding the harness 42 on the surface of the cover member 41 can reduce the increase in thickness of the cover member 41 as compared to the case in which the harness is embedded in the cover member 41. At the portion where the alternator 51 is arranged, i.e., the portion where the first harness body 42a1 is routed, the outer wall 10b and the alternator 51 are brought close to each other. This can achieve appropriate layout of the alternator 51. Also the portion where the alternator 51 is not arranged, i.e., the portion where the second harness body 42a2 is routed, can contribute to the downsizing of the engine 1.

The connector portion 42b projects outward of the cover member 41 with respect to the harness body 42a of the harness 42 covered with the cover member 41. This can ensure ease of removal of members, such as sensors including an oil level sensor, to which the harness 42 is connected.

Cover Member Mounting Method

Figure 9:
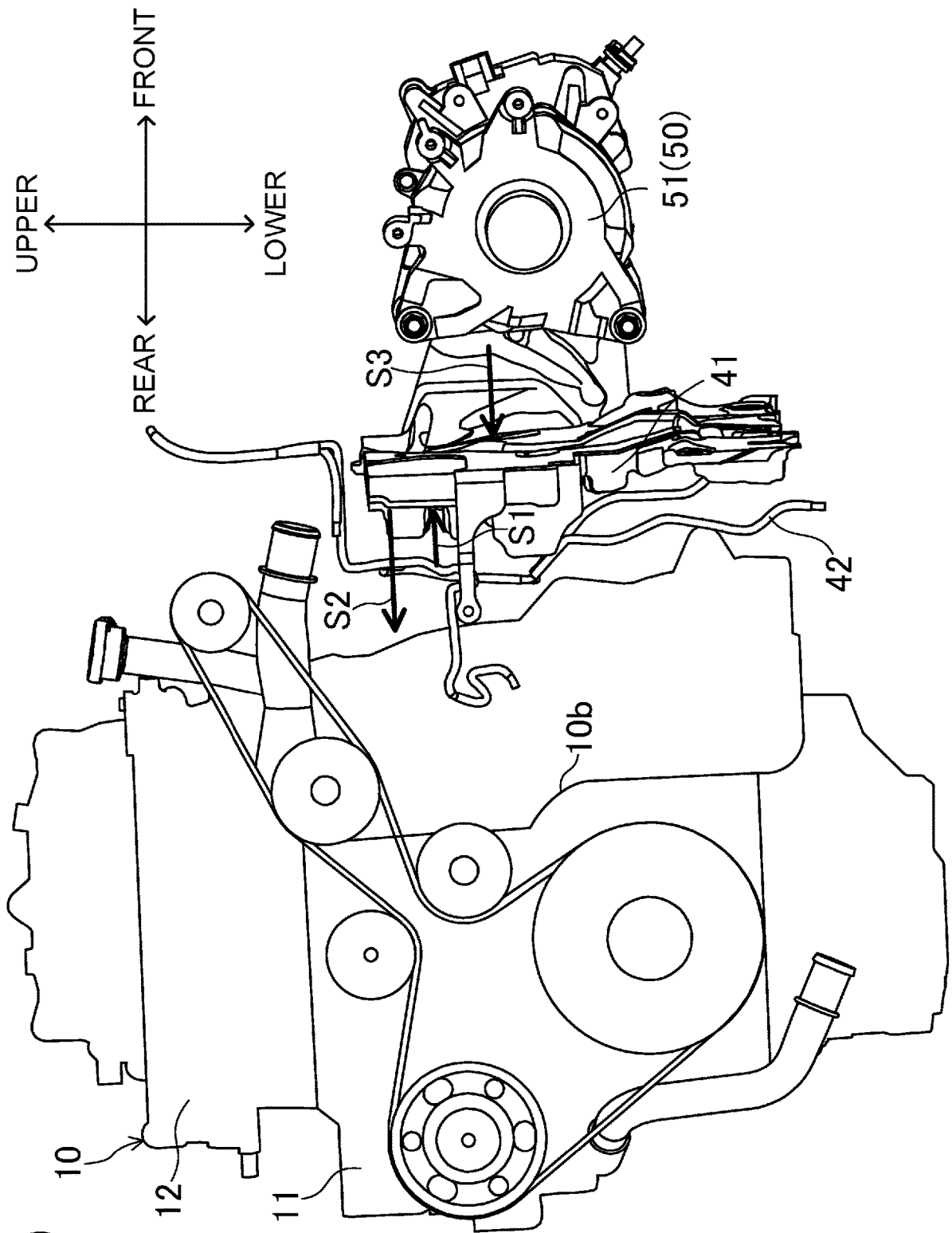
[FIG. 9]

A method for mounting the cover member mounting structure according to the present embodiment will be described below. Specifically, as indicated by an arrow S1 in FIG. 9, the harness 42 is inserted into the harness groove 41a of the cover member 41. Next, as indicated by an arrow S2, the cover member 41 in which the harness 42 is inserted is attached to the outer wall 10b of the engine body 10. Then, as indicated by an arrow S3, the alternator 51 is attached to the front side of the cover member 41.

As described above, by this mounting method, the harness groove 41a of the cover member 41 positions the harness 42. This can facilitate the attachment of the harness 42 and the assembly of the peripheral members such as the alternator 51 to the engine body 10 as compared to a conventional method in which the harness 42 is directly fixed to the outer wall of the engine body 10, and then the peripheral members are assembled.

Second Embodiment

Other embodiments according to the present disclosure will be described in detail below. In the following description, components that have been described in the first embodiment are denoted by the same reference numerals, and are not described in detail.

In contrast to the first embodiment in which the harness groove 41a is formed in the portion of the cover member 41 facing the outer wall 10b, i.e., the surface facing the engine body 10, the harness groove 41a may be provided in the portion of the cover member 41 facing the alternator 51, i.e., the surface facing the accessory 50, to receive the harness 42 in the harness groove 41a.

Third Embodiment

In the above embodiments, the harness 42 is received in the harness groove 41a of the cover member 41, but how the harness 42 is held on the surface of the cover member 41 is not limited to the configuration of the embodiments described above. For example, the harness 42 may be fixed to the surface of the cover member 41 facing the engine body 10 or the alternator 51 with a jig. Note that the configuration of the first embodiment is desirable from the viewpoint of protecting the harness 42.

Fourth Embodiment

In the above embodiments, the intermediate portion 71b, 72b is formed into a groove shape having a smaller vertical height than the shaft hole 71a, 72a. However, any configuration may be employed as long as the intermediate portion 71b, 72b permits the bolt 90 to move toward the elongated hole 71c, 72c, for example, when a load equal to or greater than a predetermined value is inputted to the alternator 51 in the direction toward the engine body 10. Specifically, for example, the intermediate portion may be formed as a fragile portion in the shape of a narrow bar that breaks to allow the bolt 90 to move when a load is inputted.

Fifth Embodiment

In the above embodiments, a groove formed by the shaft hole 71a, 72a, the intermediate portion 71b, 72b, and the elongated hole 71c, 72c is cut in the engine body support 70 as a guide mechanism. The groove is not limited to this configuration, and any configuration may be employed as long as the alternator 51 moves toward the engine body 10 to absorb a load which is greater than the predetermined value and inputted to the alternator 51 in the direction toward the engine body 10, so that the engine body 10 can be protected from damage.

Figure 10:
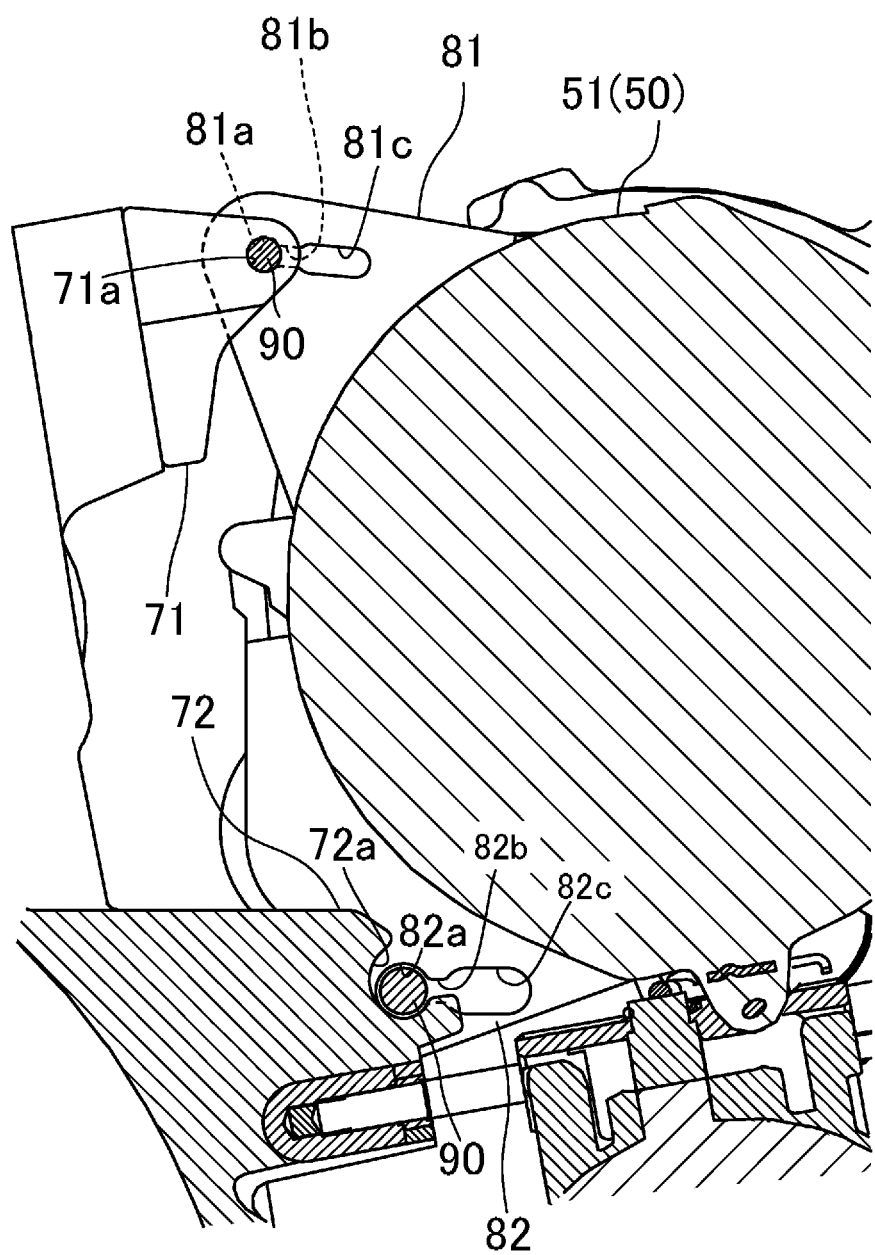
[FIG. 10]

Specifically, for example, as shown in FIG. 10, a groove serving as a guide mechanism may be cut in the accessory support 80. That is, in the configuration shown in FIG. 10, the engine body support 70 is provided with the shaft hole 71a, 72a only, and has no intermediate portion 71b, 72b and elongated hole 71c, 72c. On the other hand, the upper accessory support 81 as the accessory support 80 is provided with a groove formed by the upper accessory shaft hole 81a, an upper accessory intermediate portion 81b extending forward of the upper accessory shaft hole 81a, and an upper accessory elongated hole 81c extending forward of the upper accessory intermediate portion 81b. Almost similarly to the upper accessory support 81, the lower accessory support 82 is also provided with a groove formed by the lower accessory shaft hole 82a, a lower accessory intermediate portion 82b, and a lower accessory elongated hole 82c, as a guide mechanism.

With this configuration, when the alternator 51 receives a load in the direction toward the engine body 10, the bolts 90 respectively pass through the upper and lower accessory intermediate portions 81b and 82b and slides in the upper and lower accessory elongated holes 81c and 82c. Thus, the alternator 51 is guided to move toward the engine body 10.

Other Embodiments

The engine, which is transversely arranged in the above, may be longitudinally arranged. Further, the present invention is not limited to the in-line four-cylinder engine, and may be applied to single cylinder engines, and multi-cylinder engines such as other in-line engines, V engines, and horizontally opposed engines. In addition, the invention is not limited to the gasoline engine, and may be applied to a diesel engine.

In the embodiments described above, the accessory 50, in particular, the alternator 51, is attached as the peripheral member. However, the peripheral member is not limited thereto, and may be other accessories 50 described in the first embodiment, or components arranged around the engine body 10.

In the embodiments described above, the alternator 51 is configured to move toward the engine body 10 when a load equal to or greater than a predetermined value is inputted in the direction toward the engine body 10. However, the alternator 51 does not have to move. If the accessories 50 other than the alternator 51 or other components are arranged as the peripheral members, they may be configured to move just like the alternator 51, or not to move, when the load is inputted.

DESCRIPTION OF REFERENCE CHARACTERS

1 Engine
10 Engine Body
10*b* Outer Wall
11 Cylinder Block
11*a* Cylinder Bore
12 Cylinder Head
15 Crankshaft
41 Cover Member
41*a* Harness Groove (Groove)
42 Harness
42*a* Harness Body
42*a*1 First Harness Body
42*a*2 Second Harness Body
42*b* Connector Portion
50 Accessory
51 Alternator (Accessory)
52 Air Compressor (Accessory)
53 Supercharger (Accessory)
70 Engine Body Support (Support)
71 Upper Engine Body Support (Support)
71*a* Upper Shaft Hole (Guide Mechanism)
71*b* Upper Intermediate Portion (Guide Mechanism)
71*c* Upper Elongated Hole (Guide Mechanism)
72 Lower Engine Body Support (Support)
72*a* Lower Shaft Hole (Guide Mechanism)
72*b* Lower Intermediate Portion (Guide Mechanism)
72*c* Lower Elongated Hole (Guide Mechanism)
80 Accessory Support (Support)
81 Upper Accessory Support (Support)
81*a* Upper Accessory Shaft Hole (Guide Mechanism)
81*b* Upper Accessory Intermediate Portion (Guide Mechanism)
81*c* Upper Accessory Elongated Hole (Guide Mechanism)
82 Lower Accessory Support (Support)
82*a* Lower Accessory Shaft Hole (Guide Mechanism)
82*b* Lower Accessory Intermediate Portion (Guide Mechanism)
82*c* Lower Accessory Elongated Hole (Guide Mechanism)
90 Bolt
100 Vehicle

The invention claimed is:

1. An engine cover member mounting structure, comprising:
   an engine body mounted on a vehicle, having a cylinder block and a cylinder head;
   a peripheral member arranged on an outer wall of the engine body;
   a cover member arranged between the outer wall and the peripheral member; and
   a harness routed between the outer wall and the peripheral member, wherein
   the cover member includes a groove formed in the surface of the cover member facing the outer wall, the groove receiving the harness,
   the width of the groove is substantially equal to the diameter of the harness,
   the depth of the groove is greater than the diameter of the harness, and
   the harness is held in the groove at a predetermined distance from the outer wall.

2. The engine cover member mounting structure of claim 1, wherein
   the peripheral member is attached to the outer wall of the engine body via a support, and
   the support is provided with a guide mechanism that allows the peripheral member to move toward the engine body when a load is inputted to the peripheral member in a direction toward the engine body.

3. The engine cover member mounting structure of claim 1, wherein
   the peripheral member is an accessory.

4. The engine cover member mounting structure of claim 3, wherein
   the accessory is an alternator.

5. The engine cover member mounting structure of claim 1, wherein
   a connector portion is formed on at least one end of the harness for connection to a different member, and
   the connector portion is positioned outside the cover member.

6. An engine cover member mounting structure, comprising:
   an engine body mounted on a vehicle, having a cylinder block and a cylinder head;
   an accessory arranged on an outer wall of the engine body facing forward in a longitudinal direction of a vehicle;
   a cover member arranged between the outer wall and the accessory; and
   a harness routed between the outer wall and the accessory, wherein
   the accessory is attached to the outer wall of the engine body via a support, and
   the support is provided with a guide mechanism that allows the accessory to move rearward when a load toward a rear side in the longitudinal direction of the vehicle is inputted to the accessory,
   the harness is held in a groove formed to be recessed in a thickness direction of the cover member in a surface of the cover member facing the outer wall,
   the width of the groove is substantially equal to the diameter of the harness,
   the depth of the groove is greater than the diameter of the harness,
   the harness is held in the groove at a predetermined distance from the outer wall,
   a connector portion is formed on at least one end of the harness for connection to a different member, and
   the connector portion is positioned outside the cover member and the accessory when viewed from the front of the vehicle.

\* \* \* \* \*